No. 875,783. PATENTED JAN. 7, 1908.
N. CÔTÉ.
PROPORTIONAL DIVIDERS.
APPLICATION FILED APR. 8, 1907.
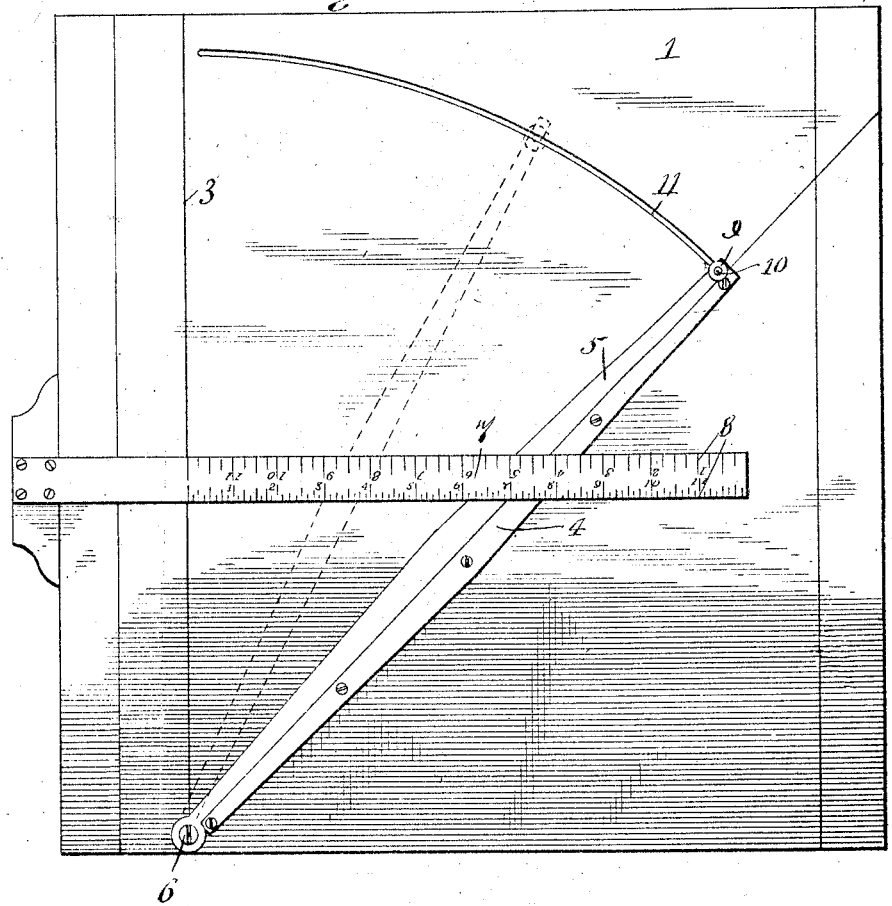
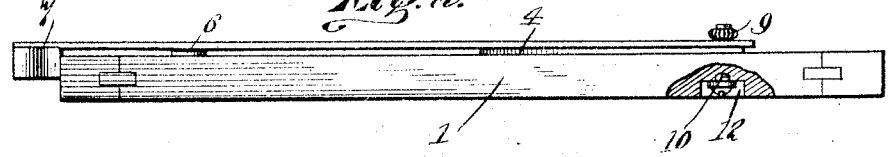
Witnesses:
Eugene M. Sliney
C. C. Cousins
Napoleon Côté
Inventor,
By Marion & Marion
Attorneys

UNITED STATES PATENT OFFICE.

NAPOLEON CÔTÉ, OF MONTREAL, QUEBEC, CANADA.

PROPORTIONAL DIVIDERS.

No. 875,783.　　　Specification of Letters Patent.　　　Patented Jan. 7, 1908.

Application filed April 3, 1907. Serial No. 367,130.

*To all whom it may concern:*

Be it known that I, NAPOLEON CÔTÉ, a subject of the King of Great Britain, residing at the city and district of Montreal, in the Province of Quebec, Canada, have invented certain new and useful Improvements in Proportional Dividers; and I do hereby declare that the following is a full, clear, and exact description of the invention, such as will enable others skilled in the art to which it appertains to make and use the same.

My invention relates to proportional dividers; the object of my invention is to provide a simple device adapted to indicate without calculation on the part of the operator the size of measured parts when the proportion of increase or decrease of a corresponding part is known, so that all of the parts of the construction may be increased or decreased in proportion without having to work out mathematically such proportion; and, my invention consists of the construction, combination and arrangement of parts, as herein illustrated, described and claimed.

In the accompanying drawings, forming part of this application, I have illustrated one form of embodiment of my invention, in which drawings similar reference characters indicate corresponding parts, and in which:

Figure 1 is a plan view; and, Fig. 2 is an edge elevation, partly broken away.

Referring to the drawings, 1 designates a base preferably of metallic construction. Formed or indicated on the base 1, is a base line 3, parallel to one edge of the base. Secured on the base 1 is a stop strip 4, disposed with its straight edge at an angle of forty-five degrees to the base line 3. An indicating strip 5 is pivoted at 6 on the base line 3, and is free to swing in the arc of a circle from its pivotal point 6. A T-square 7 is adapted to be moved over the surface of the base 1, and is provided with a scale 8, commencing at a point coinciding with the base line 3. It will be understood that any other means than a T-square having a scale thereon commencing at the base line 3 may be used, and this member may be permanently maintained on the base 1, so that it lies at right angles to said base line. A thumb nut 9 is disposed on a bolt 10, the latter of which is placed through the slot 11 formed in the base 1, and through the free end of the indicating strip 5, and the head of the bolt is disposed in a channel 12 in the under surface of the base 1, so that the indicating strip 5 may be locked in any desired position.

In the operation of the invention, when it is desired to increase the proportion of a construction, the thumb nut 9 is loosened, so that the strip 5 is free to be moved. The measurement of one part of the construction to be enlarged is taken by the scale 8, and the straight edge of the strip 5 is made to coincide with such measurement when the scale 8 registers with the straight edge of the strip 4 at a point corresponding to the increase which is to be made of the measured part. That is to say, if a part five inches in length is to be increased to seven inches in length, the scale 8 will be moved on the base 1 until the "7" of the scale coincides with the straight edge of the strip 4, and the indicating strip 5 will be moved to coincide with the mark indicating "5" on said scale, and the indicating strip will then be locked in position. Any measurement of any other part of the construction to be enlarged will be taken on the scale 8, and the point indicated on the scale by such measurement will be made to coincide with the straight edge of the indicating strip 5. The point indicated on the scale 8 by the straight edge of the stop strip 4 will indicate the length in inches, or other units, of increase. When a construction is to be reduced, the reverse of this operation takes place, in that a part is measured, and such measurement as indicated on the scale 8 is brought to coincide with the straight edge of the stop strip 4. The indicating strip is then moved to coincide with the increase and locked in position. Measurements of different parts are taken and caused to coincide with the stop strip 4, and the reduction is indicated by the straight edge of the strip 5.

Having thus fully described my invention, what I claim as new, and desire to secure by Letters Patent, is:

1. In an instrument of the character described, a base, a stop strip rigidly secured thereto, a base line extending along one edge of said base strip, a member slidably mounted on said base member, a scale on the slidable member extending at right angles to said base line, an indicating strip pivoted adjacent one end of said base line, and means for guiding and locking said strip in any adjusted position.

2. In an instrument of the character described, a base, a stop strip rigidly secured thereto, a base line extending along one edge of said base strip, a member slidably mounted on said base member, a scale on the slidable member extending at right angles to said base line, an indicating strip pivoted adjacent one end of said base line, and means for guiding and locking said strip in any adjusted position, said means comprising a slot extending through the base member and a bolt attached to the outer end of the indicating strip and playing through said slot.

3. In an instrument of the character described, a base, a stop strip rigidly secured thereto, a base line extending along one edge of said base strip, a member slidably mounted on said base member, a scale on the slidable member extending at right angles to said base line, an indicating strip pivoted adjacent one end of said base line, and means for guiding and locking said strip in any adjusted position, said means comprising a slot extending through the base member and a bolt attached to the outer end of the indicating strip and playing through said slot and a thumb nut on said bolt for locking the parts in adjusted position.

4. In an instrument of the character described, a base member, a stop strip rigidly secured thereto, a base line on said base member, a movable scale intersecting said base line, an indicating strip pivoted adjacent one end of said base line and coöperating with said scale, and means for guiding said strip and for locking the same in any adjusted position, said means comprising a slot extending through said base member and communicating with a channel in said base member, a bolt playing through said slot and provided with a head traversing the aforesaid channel, said bolt likewise being attached to the aforesaid indicating arm, and a thumb nut adapted to screw upon the outer end of said bolt to thereby clamp the parts in adjusted position.

In witness whereof I have hereunto set my hand in the presence of two witnesses.

NAPOLEON CÔTÉ.

Witnesses:
C. C. COUSINS,
E. M. SLINEY.